United States Patent

[11] 3,562,503

[72] Inventors Earl G. Carson
Franklin Park;
Ben D. Conger, West Long Branch, N.J.

[21] Appl. No. 722,355
[22] Filed Apr. 18, 1968
[45] Patented Feb. 9, 1971
[73] Assignee Electronics Associates, Inc.
Long Branch, N.J.
a corporation of New Jersey

[54] CHECKING CIRCUIT FOR STABILIZED OPERATIONAL AMPLIFIERS
1 Claim, 2 Drawing Figs.

[52] U.S. Cl. .......... 235/153, 235/184; 330/2; 340/146.1, 340/149
[51] Int. Cl. .......... G06g 7/06, G06f 11/00
[50] Field of Search .......... 235/153, 184, 183; 340/172, 149, 146.1; 330/2

[56] References Cited

UNITED STATES PATENTS

| | | | |
|---|---|---|---|
| 3,035,232 | 5/1962 | Draganjac et al. | 330/2 |
| 3,122,729 | 2/1964 | Bothwell et al. | 340/149X |
| 3,237,097 | 2/1966 | De Santis | 330/2X |
| 3,293,452 | 12/1966 | Horwitz et al. | 340/149X |
| 3,341,816 | 9/1967 | Davis et al. | 340/149X |

*Primary Examiner*—Malcolm A. Morrison
*Assistant Examiner*—Felix D. Gruber
*Attorneys*—Edward A. Petko and Robert M. Skolnik

ABSTRACT: The specification discloses a circuit arrangement enabling automatic balance checking of operational amplifiers in an analogue computer by sequential connection of the stabilizer amplifier outputs to comparator means whose output, if any, controls an indicator and a stepping, or a stepping alone, to the next amplifier to be checked developing thereby a record or other indication of those amplifiers in need of rebalance.

CHECKING CIRCUIT FOR STABILIZED OPERATIONAL AMPLIFIERS

Some high-speed analogue and hybrid computers now in use utilize chopper stabilized operational amplifiers. The addition of chopper stabilization to previously known amplifier circuits minimized the serious drift problems which characterized these circuits. While the chopper stabilization greatly reduced the drift problem, some drift still remains in stabilized operational amplifiers. For example, as shown in U.S. Pat. No. 3,081,435 to M.A. Miller, a stabilized operational amplifier generally consists of a direct coupled amplifier section and a stabilizer section. The direct coupled amplifier section has a differential input stage, one or more intermediate stages, and an output stage, while the stabilizer section includes a modulator, a stabilizer amplifier and a demodulator.

Analogue and hybrid computers are utilized for problem solving where accurate outputs are required. A modern large hybrid computer may consist of 300 or more stabilized operational amplifiers. Of these 300, 60 or more may function as electronic integrators. In the electronic integrator, great inaccuracies occur if any drift is present since the drift is integrated along with the signal input thus amplifying the drift error.

Drift in stabilized operational amplifiers is usually thought of as a time dependent output level caused by voltage changes within the amplifier itself with no input signal applied. Though drift is a very important factor, it is but one component of a larger problem which may be termed amplifier output error. With no input signal, amplifier output error includes both drift and the effects of leakage resistance and distributed capacitance, insulation breakdown, errors in values of circuit components, etc. Thus, the resetting or rebalancing of a stabilized operational amplifier corrects for much more than drift alone.

Standard practice on analogue and hybrid computers employing stabilized operational amplifiers includes with no input signal applied, resetting the amplifiers to as close to zero output as is possible. The procedure entails disconnecting the input circuit elements from the operational amplifier and checking the stabilizer amplifier output with no signal input. In practice, the above disconnections are made and a meter is attached to the stabilizer amplifier output. The operator then notes the reading on the meter and adjusts the setting of a balance potentiometer whose output is coupled to the direct coupled amplifier stage. In this manner, the stabilized operational amplifier output is minimized. This procedure is performed for each amplifier. An example of a balance potentiometer circuit for adjusting a stabilized operational amplifier is shown in U.S. Pat. No. 3,237,097.

In analogue and hybrid computer installations where high accuracy is desired, all amplifiers must be balanced each day, or before each problem run. In installations where lower accuracy is acceptable, the integrators only may be rebalanced each week.

Thus, the rebalancing of stabilized operational amplifiers constitutes a considerable burden to users of analogue and hybrid computers.

It is, therefore, an object of the present invention to minimize the time and effort involved in the rebalancing procedure described above.

A further object of the present invention resides in the provision of means to automatically scan the outputs of all the operational amplifiers in the computer in sequence.

A still further object of the present invention is the provision of circuitry to sense the value present at the individual stabilizer amplifier output and determine whether said value is at an acceptable level. If said value is not at an acceptable level, a printout of those amplifiers whose values exceed said level is obtained. If said value is acceptable, a new amplifier is then connected for analysis.

These as well as other objects and advantages of the present invention will be apparent to those skilled in the art from a reading of the following specification and drawings in which.

In brief, the present invention connects all the stabilizer amplifier outputs to a common stabilizer buss through respective switch means for each stabilizer amplifier. The stabilizer buss is connected to an appropriate meter. The output of each stabilizer amplifier is connected via the stabilizer buss to the input of a comparator circuit which compares the stabilizer amplifier output with predetermined tolerable error limits. If the comparator shows that the stabilizer amplifier output is within allowable limits, a signal is produced causing the switches to step to the next stabilizer amplifier. If the comparator indicates that the stabilizer amplifier output is unacceptable, a print signal is produced causing a number or other indication to be made available to an operator. In this manner, all stabilizer amplifiers are sampled in sequence and a list or other indication of those amplifiers in need of rebalance is provided. The operator then rebalances only those amplifiers shown to be outside the acceptable preset level avoiding wasted effort on the remaining amplifiers.

Figure 1:
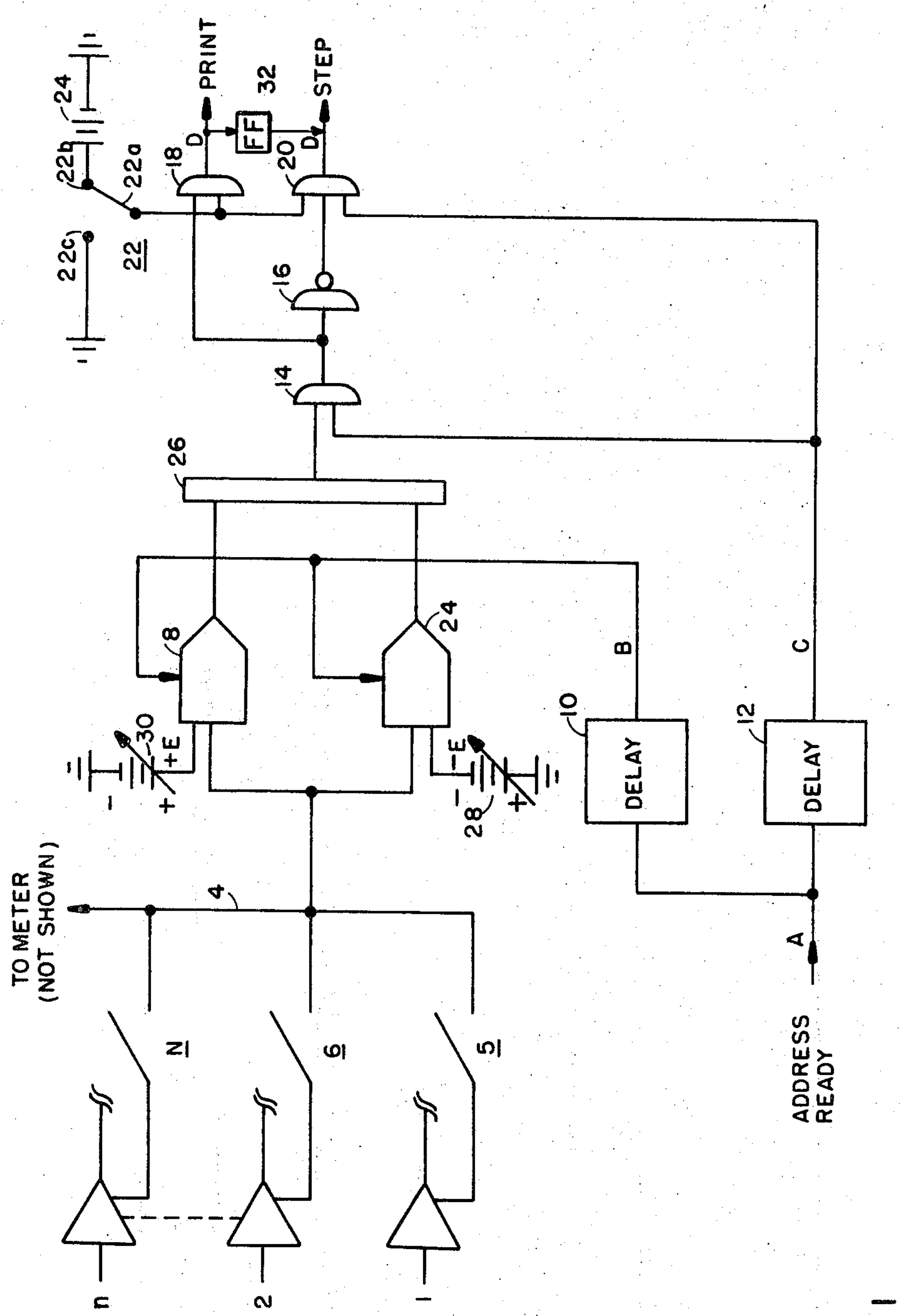
FIG. 1 is a block diagram of the invention.

In FIG. 1, reference numerals 1, 2, *n* denote the stabilizer amplifiers of respective direct coupled stabilized operational amplifiers. These stabilized operational amplifiers constitute the computing elements of the analogue or hybrid computer. The outputs of the stabilizer amplifiers 1, 2, *n*, are sequentially sampled via switch means, 5, 6, N and coupled to stabilizer buss 4. Stabilizer buss 4 is connected to an appropriate meter such as a digital voltmeter, not shown.

As each stabilizer amplifier 1, 2,...*n* output is connected to buss 4, that output is also connected to the inputs of comparators 8 and 24. These comparators are standard circuit items such as shown in FIG. 10–14*c*, page 398, of Electronic Analogue and Hybrid Computers, by Korn and Korn, published by McGraw-Hill in 1964. Signals from variable voltage sources such as batteries 28 and 30 representing ±E, the predetermined allowable error voltages, are also fed to comparators 8 and 24. Comparator 8 will produce an output if the error voltage at the comparator input exceeds the predetermined positive limit while comparator 24 will produce an output if the error voltage at its input exceeds the predetermined negative limit. The outputs of comparators 8 and 24 are connected through an OR gate 26 to an AND gate 14.

Figure 2:
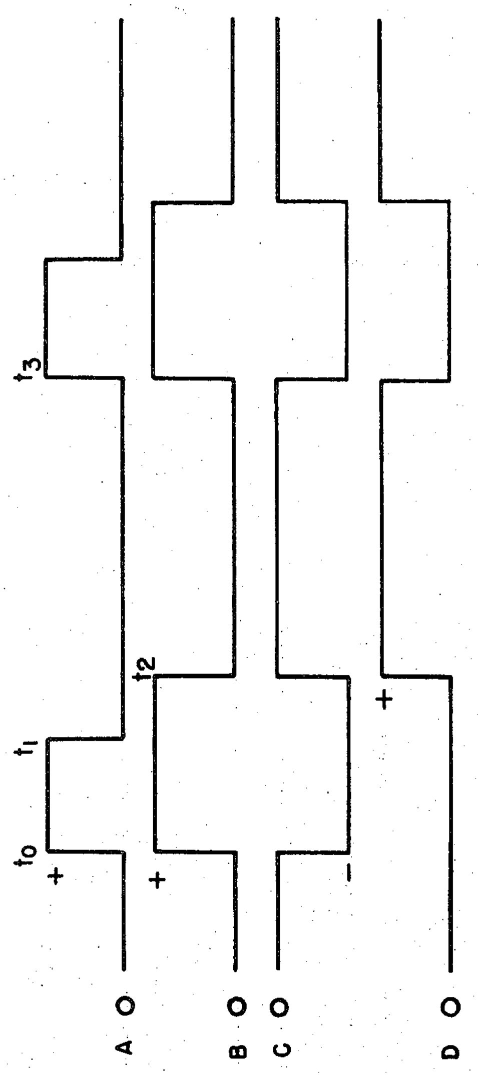
FIG. 2 is a diagram of the signal levels at various points in the circuit of FIG. 1.

Because of the transient signals present in the stabilizer amplifier when its output is connected to buss 4, some time delay period is necessary to permit the transients to die out. This delay is developed in the present invention by the output of delay circuit 10. Delay 10 is driven by a positive pulse, (FIG. 2A) for the time $t_0$ to $t_1$ from a pulse source, not shown, to enable the reading taken by the comparators 8 and 24. As shown in FIG. 2B, the output of delay 10 holds comparators 8 and 24 in an unresponsive condition for the period $t_0$—$t_2$ just long enough to permit the transient output of amplifiers 1, 2, . . .*n* to die out thereby ensuring comparison based on actual amplifier output rather than the transient amplifier output. Both comparators are latched for the period $t_2$—$t_3$ during which period an output is produced if the magnitude of the input exceeds either of the preset error voltages ±E. The comparator output, if any, is connected to logical AND gate 14 via an OR gate 26. The other input to AND gate 14 is developed by the output of delay circuit 12. This output, FIG. 2C, inhibits AND gate 14 for the period $t_0$—$t_2$ and uninhibits AND gate 14 for the period $t_2$—$t_3$. If the inputs to AND gate 14 occurs during the period $t_2$—$t_3$, an output pulse is developed and fed to both AND gate 18 and inverting gate 16. If OR gate 26 produces no output, indicating that the error output of the stabilizer amplifier is within the desired limits, no signal (i.e. zero) appears at the output of AND gate 14.

AND gates 18 and 20 control the printing of the list or other indication of those amplifiers whose drift is outside the desired limits and the stepping to the next amplifier to be checked. AND gate 18 receives as inputs the output of gate 14, either zero or positive, developed as described above, and a positive control signal from switch 22. Switch 22 consists of grounded contact 22*c*, contact 22*b* biased positively positive by battery 24, and arm 22*a*. When the signals at the input of AND gate 18 are both positive, a PRINT output is produced indicating that a particular stabilizer amplifier is out of balance. Switch 22 provides an additional inhibit control for the PRINT and STEP functions to stop these functions when the operator desires to examine particular amplifiers on the digital voltmeter (not shown) alone.

When the signals at the input of AND gate 20 during the uninhibit period $t_2$—$t_3$ of Waveform C, are all positive, a STEP signal is produced indicating that the particular amplifier under test is properly balanced. This occurs because of inverting gate !6. The "zero" output of AND gate 14, indicating proper balance, appears as zero at the input of AND gate 18, thus inhibiting that gate; however, that same zero output is inverted by gate 16 and appears as a positive input to AND gate 20. Energization of the PRINT output also steps the circuit to the next amplifier to be checked after a delay introduced by a flip-flop 32. The delay, if required should be sufficient to allow the printer time to ready itself for the next reading for the reasons set forth in column 7, lines 10—13 of U.S. Pat. No. 3,453,421.

In operation, first switch 22 is connected to battery 24, then the automatic cycle is initiated at time $t_o$.

The present invention is designed for use with the sequential scanning system disclosed in the assignee's copending application, Ser. No. 455,470 filed May 13, 1965, now U.S. Pat. No. 3,453,421, in the name of Alfred G. Tonnessen, a coworker of applicant, entitled "Readout system." That application discloses a system for automatic sequential scanning of outputs of a plurality of analogue computing elements and the recording of those outputs on a AC, or other mechanism. The system is described in detail in paragraphs 2.2—2.3 and FIG. 8 of the publication entitled EAI 8800 Scientific Computing System, Maintenance Series, Control and Monitoring Groups, published by Electronic Associates, Inc., West Long Branch, New Jersey, July 1966, Publication No. 00800.1146—0.

In practice, the PRINT output of AND gate 18 would be connected to the input of the printer; the step output of AND gate 20 would be connected to the stepping counter; and the address ready input to delays 10 and 12 would be connected to the inhibit output of the control logic as shown in said Manual and said application. The foregoing description is based on a DC input to the comparators. If, however, that input is AC, an RC integrating circuit may be inserted before the comparator inputs to convert the AC signal to a DC level.

Now that the principal embodiment of the invention has been described, it will be apparent that modifications thereto may be made without departing from the spirit and scope thereof. Therefore, the foregoing specification is to be considered as illustrative of the invention, the scope being determined by the appended claims.

I claim:

1. A circuit for comparing the output error condition of a plurality of analogue computing elements against predetermined voltage limits comprising:
   - a plurality of analogue computing elements each producing an output error signal in response to zero input signal;
   - comparison means, responsive to said error signal, for producing an output indication if said error is within said predetermined limits;
   - control means connected to said comparison means to render said comparison means unresponsive to said output error signal for a first predetermined time, and responsive to said output error signal for a second period of time, said comparison means producing an output during said second period of time if said error signal exceeds said predetermined limits;
   - a first logical AND gate having inputs connected to said comparison means and said control means, and an output;
   - a source of voltage;
   - a second logical AND gate having inputs connected to said source of voltage, said output of said first logical AND gate, and an output;
   - inverting means having an input connected to said output of said first logical AND gate, and an output; and
   - a third logical AND gate having inputs connected to said source of voltage, said inverting means output, and said control means, whereby during said second period of time, an output is produced by either said second or said third AND gates as a function of the production of an output by said comparison means.